Sept. 9, 1930.  P. A. KETCHPEL ET AL  1,775,105
HYDRAULIC BRAKE FOR MOTOR VEHICLES
Filed Sept. 1, 1928   2 Sheets-Sheet 1

INVENTORS
PAUL A. KETCHPEL
NATHAN M. LOWER
By Gillson, Mann & Cot attys.

Sept. 9, 1930.  P. A. KETCHPEL ET AL  1,775,105
HYDRAULIC BRAKE FOR MOTOR VEHICLES
Filed Sept. 1, 1928   2 Sheets-Sheet 2
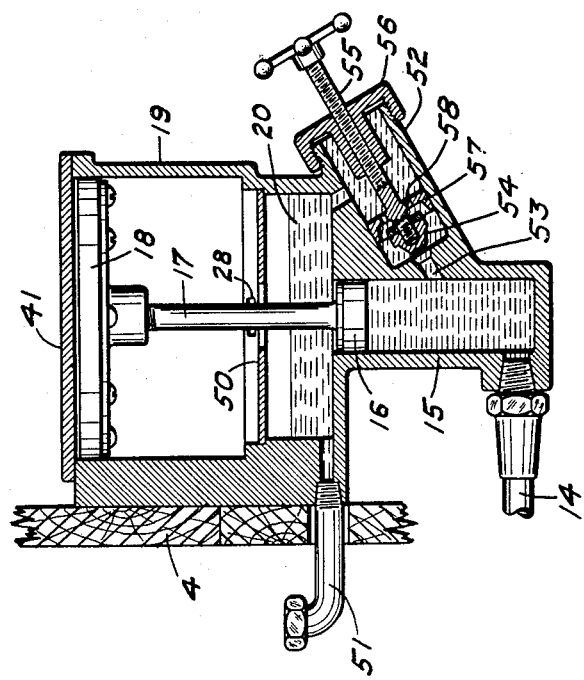
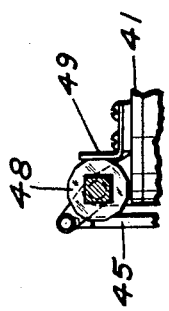
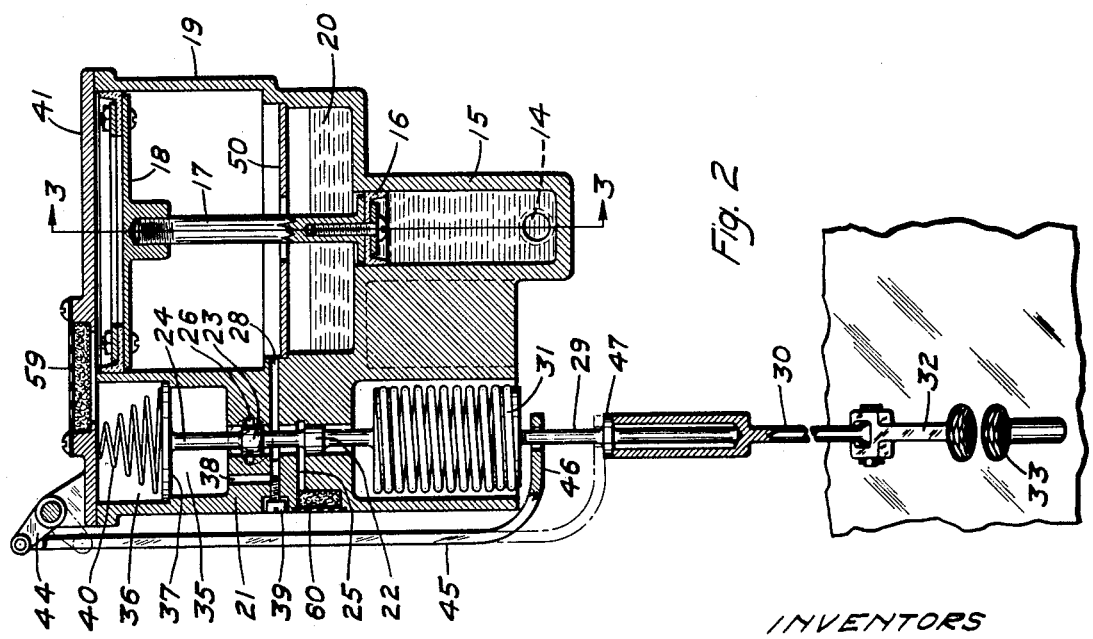
INVENTORS
PAUL A. KETCHPEL
NATHAN M. LOWER Patented Sept. 9, 1930

1,775,105

UNITED STATES PATENT OFFICE

PAUL A. KETCHPEL AND NATHAN M. LOWER, OF PITTSBURGH, PENNSYLVANIA; SAID KETCHPEL ASSIGNOR TO SAID LOWER

HYDRAULIC BRAKE FOR MOTOR VEHICLES

Application filed September 1, 1928. Serial No. 303,504.

The invention relates specifically to hydraulic brakes for motor vehicles, though applicable as to some of its features to brakes of other types, and has for its object the provision of means for operating such brakes by a vacuum motor operated by suction derived from an internal combustion engine and by either hand or foot.

While the invention may be embodied in various ways, a simple and efficient form of construction is hereinafter described and is illustrated in the accompanying drawings, in which Fig. 1 is a detail, longitudinal, vertical section of the vehicle showing the brake controlling mechanism mainly in elevation;

Fig. 2 is a detail section on the line 2—2 of Fig. 1, some of the associated parts being shown in elevation.

Fig. 3 is a detail section on the line 3—3 of Fig. 2; and

Fig. 4 is a detail section partly in elevation on the line 4—4 of Fig. 1.

Figure 1:
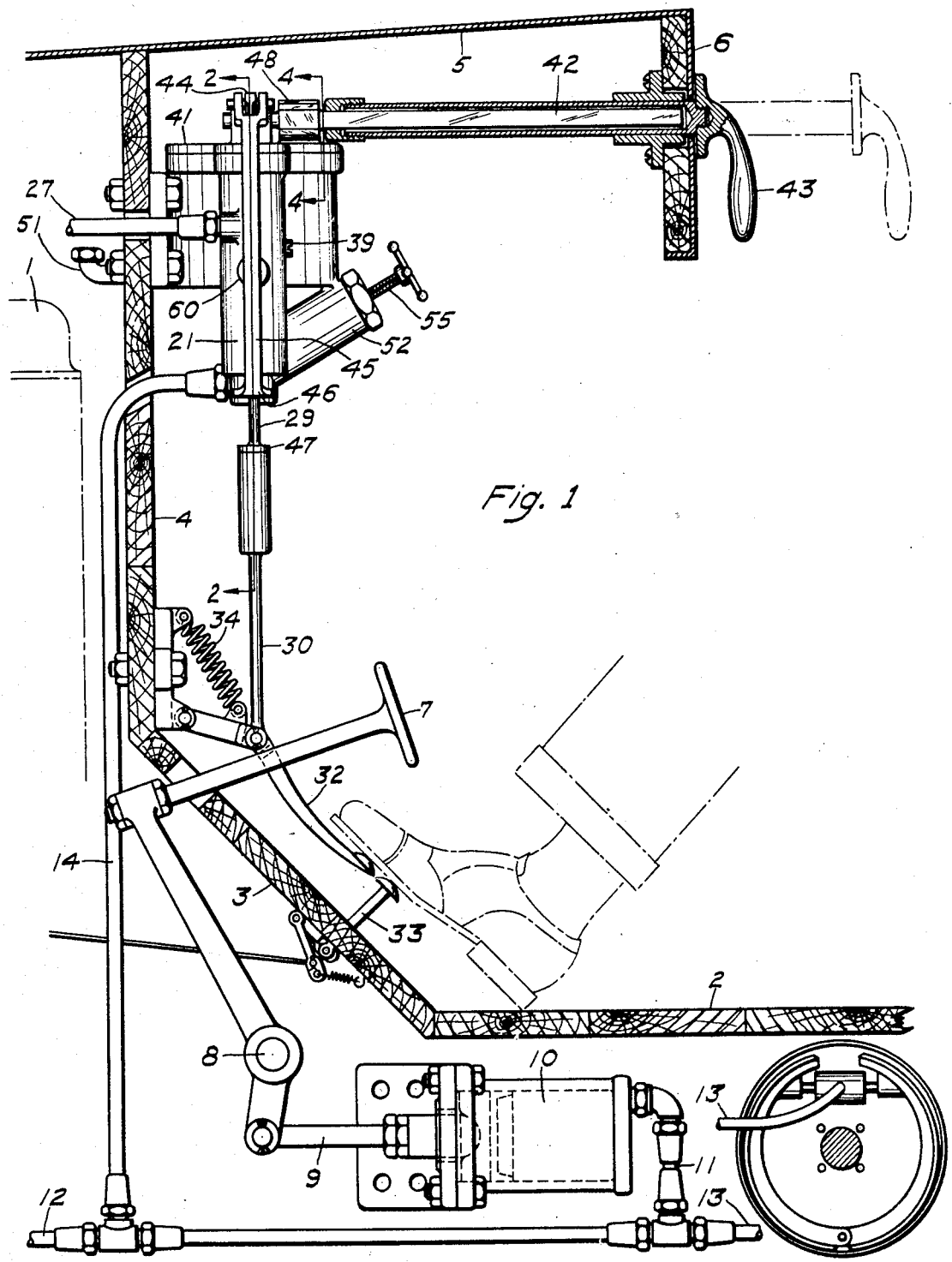

An internal combustion engine for driving the vehicle is indicated at 1; the front floor boards are shown at 2; the toe boards at 3; the front plate of the vehicle at 4; the cowl sheet at 5; and the instrument board at 6.

The usual brake pedal is shown at 7 and is present for use alternatively with the vacuum motor. This pedal is shown as pivoted in the usual manner at 8 and as being connected by means of a piston rod 9 with a plunger reciprocating within a fluid cylinder 10 which is connected by means of pipes 11, 12 and 13 with suitable brake cylinders. A pipe 14 connected into the pipe system just named leads from a pressure cylinder 15 conveniently located immediately back of the front plate 4 and below the cowl sheet 5. The plunger 16 reciprocating within the cylinder 15 has its stem 17 attached to the piston 18 of a vacuum motor comprising a cylinder 19 and a liquid storage chamber 20.

The vacuum motor is controlled by a valve housed within a suitable casing 21 which may be cast integrally with the pressure cylinder 15 and the motor cylinder 19. The controlling valve comprises a pair of piston heads 22, 23 carried by a common stem 24 and reciprocating in a vertical, cylindrical valve chamber in the casing 21.

The head 22 controls an externally opening port 25 and the head 23 controls a port 26 connected as by means of a pipe 27 with a vacuum chamber of the engine 1, such as the intake manifold or a power cylinder. This latter connection may be made in any suitable manner and is not shown as such connections are quite common in the vehicle brake art.

A duct 28 connects the cylinder 19 with the valve chamber, between the ports 25, 26, with which it may be alternatively brought into communication by suitable shifting of the valve.

The valve is controlled by means of a telescopically jointed rod comprising the sections 29, 30, the former being connected to the valve stem 24 through the medium of a spring 31, and the latter being attached to a pedal 32 pivoted to the front plate 4 and having its power end so positioned that the operator's foot will rest upon it when applied to the usual accelerator button 33. A retractile spring 34 anchored to the front plate 4 and attached to the pedal 32 urges the latter upwardly and with it the telescopically jointed rod and the spring 31, tending to move the controlling valve upwardly to close the port 25 and open the port 26.

Within the upper portion of the valve casing 21, there is formed a volume chamber 35 which is open to the valve chamber. The upper portion of the chamber 35 takes the form of a cylinder 36 within which reciprocates a piston 37 mounted upon the valve stem 24. A duct 38 of small capacity connects the chamber 35 with the duct 28 and a screw plug 39 entered through the side wall of the valve casing 21 affords means for still further restricting the duct 38. A spring 40 reacting between the piston 37 and the cover plate 41 of the cylinders 19 and 36 urges the valve downwardly to open the port 25 and close the port 26.

For the purpose of controlling the vacuum motor valve manually, there is provided a shaft 42 journaled at one end in suitable bearings formed on the cover plate 41 and at its other end in bearings carried by the instrument board 6 through which the shaft passes. A handle 43 fixed to the rear end of the shaft affords means for turning the latter, and the shaft being telescopically extensible, the handle may be drawn back as indicated in dotted lines, Fig. 1, to be in more convenient reach of the operator. The forward end of the shaft 42 carries a crank arm 44 from which depends a rod 45, extending below the casing 21 and having its lower end bent laterally thereunder as shown at 46 and provided with an eye for receiving the upper section 29 of the valve controlling rod.

A button or shoulder 47 formed on the rod section 29 is engageable by the lower end 46 of the rod 45 when the latter is depressed by the turning of the shaft 42, thereby preventing the controlling valve from being raised by the action of the spring 34.

Suitable means is preferably provided for locking the shaft 42 in the various positions to which it may be turned. For this purpose, there is shown a polygonal disk 48 fixed upon the shaft and being engaged by a leaf spring 49 secured to the cover plate 41.

The storage chamber 20 being a mere extension of the cylinder 19 of the vacuum motor occupies but very little space upon the vehicle. The stem 17 connecting the piston 18 and plunger 16 passes freely through it. Preferably a septum 50 separates this chamber from the chamber of the cylinder to prevent the liquid from being thrown into the duct 28 by the violent movements of the vehicle. A filling nipple 51 communicates with the storage chamber and preferably extends through the plate 4, its outer end being upturned and closed by a suitable cap.

The pipe system of the hydraulic brake is replenished from time to time from the storage chamber 20 through a barrel 52 leading therefrom and communicating as shown at 53 with the cylinder 15 or any other suitable part of the system. A valve 54 closes the opening 53 and is controlled by means of a screw shaft 55 setting through the cap 56 closing the upper end of the barrel 52.

Preferably a plunger 57 is mounted on the shaft 55 for forcing the liquid into the pipe system, this plunger being suitably ported as indicated at 58 to permit the liquid to pass through it when withdrawn, the ports being closed as the plunger advances.

A suitable opening is provided in the cover plate 41 to admit air above the pistons 18 and 37 and preferably a screen 59 covers this opening for the purpose of excluding dirt and a screen 60 is also applied to the outer end of the port 25 for the same purpose.

As above pointed out, the vacuum motor may be controlled either by hand or foot. The valve 23 is normally open under the influence of the spring 34 and is held in closed position either by the foot of the operator or by the lowering of the rod 45. To apply the brake, therefore, the operator merely lifts his foot from the pedal or turns the handle 43 to raise the rod 45. Upward movement is communicated to the valve through the spring 31. The valve is returned to the position of Fig. 2 by atmospheric pressure on the head 37 supplemented by the spring 40, the principal function of which, however, is to prevent jumping of the valve incident to travel jars.

For the purpose of a light application of the brake, the handle 43 may be turned sufficiently to permit a partial opening of the valve 23, or the foot pressure upon the pedal may be somewhat relaxed. A full application of the brakes is made by removing all restraint from the spring 34.

As the controlling valve moves upwardly, a partial vacuum is developed within the chamber 35 and is augmented as the port 26 is opened, the engine suction being applied to this chamber through the duct 38. Upon the opening of the port 26, the piston 18 is moved downwardly by atmospheric pressure, placing the liquid contents of the pipe system under pressure and thus applying the brakes. The increasing atmospheric pressure on the piston 37 tends to close the valve against the resistance of the spring 31. Upon the complete closing of the valve, the pressure upon the brakes is, of course, relieved as the admission of air through the port 25 restores the equilibrium in the cylinder 19. As the same result is produced in the cylinder 3 the valve is at once reopened by the spring 31 and pressure upon the brake system is reapplied. By this action, there results in the case of light brake applications a succession of applications of diminishing force. The initial opening of the valve is sufficiently quick to provide for the picking up of all slack in the brake mechanism, but the action of the vacuum motor is quickly checked unless an emergency application is purposely made.

Upon the removal of the pressure of the spring 34, atmospheric pressure insures the closing of the valve, and upon the opening of the port 25, the piston 18 is retracted by the reaction of the brakes.

We claim as our invention:

1. In vehicle brakes in combination, hydraulic means for actuating the brakes, a vacuum motor for compressing the hydraulic means, an internal combustion engine and connection between the motor and a suction chamber of the engine, a control valve in such connection, a foot control for operating said valve and manual means for rendering the foot control inoperative.

2. In vehicle brakes in combination, hydraulic means for actuating the brakes, a vacuum motor for compressing the hydraulic means, an internal combustion engine and connection between the motor and a suction chamber of the engine, a control valve in such connection, a pedal for controlling the valve, and a pedal for controlling the engine, such pedals being positioned for simultaneous application of a foot of the operator.

3. In vehicle brakes in combination, hydraulic means for actuating the brakes, a vacuum motor for compressing the hydraulic means, an internal combustion engine and connection between the motor and a suction chamber of the engine, a control valve in such connection, spring means for opening the valve, and a pedal for rendering the spring means inactive.

4. In vehicle brakes, in combination, hydraulic means for actuating the brakes, a vacuum motor for compressing the hydraulic means, an internal combustion engine and connection between the motor and a suction chamber of the engine, a control valve in such connection, spring means for opening the valve, and hand actuated means for rendering the spring means inactive.

5. In vehicle brakes in combination, hydraulic means for actuating the brakes, a vacuum motor for compressing the hydraulic means, an internal combustion engine and connection between the motor and a suction chamber of the engine, a control valve in such connection, spring means for opening the valve, and dual means for rendering the spring means inactive.

6. In a vehicle brake system in combination, a vacuum motor for developing brake applying power, means for transmitting such power, a normally closed valve for controlling the motor, a telescopically extensible rod for opening the valve, spring means for advancing the rod, and a pedal for restraining the spring.

7. In a vehicle brake system in combination, a vacuum motor for developing brake applying power, means for transmitting such power, a normally closed valve for controlling the motor, a telescopically extensible rod for opening the valve, spring means for advancing the rod, and hand controlled means for restraining the spring.

8. In a vehicle brake system in combination, means for transmitting power to the brakes, a vacuum motor for applying such power to the transmitting means, a normally closed controlling valve for the motor, a spring advanced thrust rod for opening the valve and having a shoulder, a hand operated crank shaft, a rod connected with the crank of the shaft and engageable as a detent with the thrust rod shoulder.

9. In a vehicle brake system in combination, means for transmitting power to the brakes, a vacuum motor for applying such power to the transmitting means, a normally closed controlling valve for the motor, a spring advanced thrust rod for opening the valve and having a shoulder, an extensible hand operated crank shaft, a rod connected with the crank of the shaft and engageable as a detent with the thrust rod shoulder.

10. In a vehicle brake system in combination, means for transmitting power to the brakes, a vacuum motor for applying such power to the transmitting means, a normally closed controlling valve for the motor, a spring advanced thrust rod for opening the valve and having a shoulder, a hand operated crank shaft, a rod connected with the crank of the shaft and engageable as a detent with the thrust rod shoulder, and means for restraining the turning movement of the shaft.

11. In a vehicle brake system in combination, means for transmitting power to the brakes, a vacuum motor for applying such power to the transmitting means, a normally closed controlling valve for the motor, a spring advanced thrust rod for opening the valve and having a shoulder, a hand operated crank shaft, a rod connected with the crank of the shaft and engageable as a detent with the thrust rod shoulder, a polygonal disk on the shaft, and a leaf spring bearing against the periphery of the disk.

12. In a hydraulic vehicle brake in combination, a pipe system, a compression cylinder connected with the system, a plunger reciprocating in the cylinder, a reciprocating vacuum motor having its axis alined with that of the cylinder, and a rod rigidly connecting the piston of the motor with the plunger.

13. In a hydraulic vehicle brake in combination, a pipe system, a compression cylinder connected with the system, a plunger reciprocating in the cylinder, a reciprocating vacuum motor having its axis alined with that of the cylinder, a rod rigidly connecting the piston of the motor with the plunger, the chamber of the motor cylinder being enlarged to provide a storage receptacle for a reserve supply of liquid for the pipe system, and means for transferring the liquid from such receptacle to the pipe system.

14. In an automotive vehicle, in combination, a vehicle motor, power means for actuating a brake system for the vehicle, a normally open valve for such means, a pedal for closing such valve, and a normally retracted pedal for controlling the motor, such pedals being relatively positioned for simultaneous application of the operator's foot.

15. In combination, a vehicle having a brake system, an internal combustion motor for driving the vehicle, a vacuum motor for actuating the brake system connection between such motor and a vacuum chamber of the first-named motor, a normally open valve in such connection, a pedal for closing the valve, a normally closed throttle valve for the first-named motor, and a pedal for opening the throttle valve, the two pedals being positioned for simultaneous actuation.

16. In combination, an internal combustion motor having a throttle valve, a vacuum motor, connection between the suction side of the vacuum motor and a vacuum chamber of the first-named motor, a valve in such connection, spring means for opening the valve, a pedal for opening the throttle valve, and a pedal for opposing the named spring means, such pedals being positioned for simultaneous actuation.

In testimony whereof we affix our signatures.

PAUL A. KETCHPEL.
NATHAN M. LOWER.